May 17, 1927.
E. J. LATTIN
1,628,728
SPARE TIRE CARRIER
Filed July 9, 1926
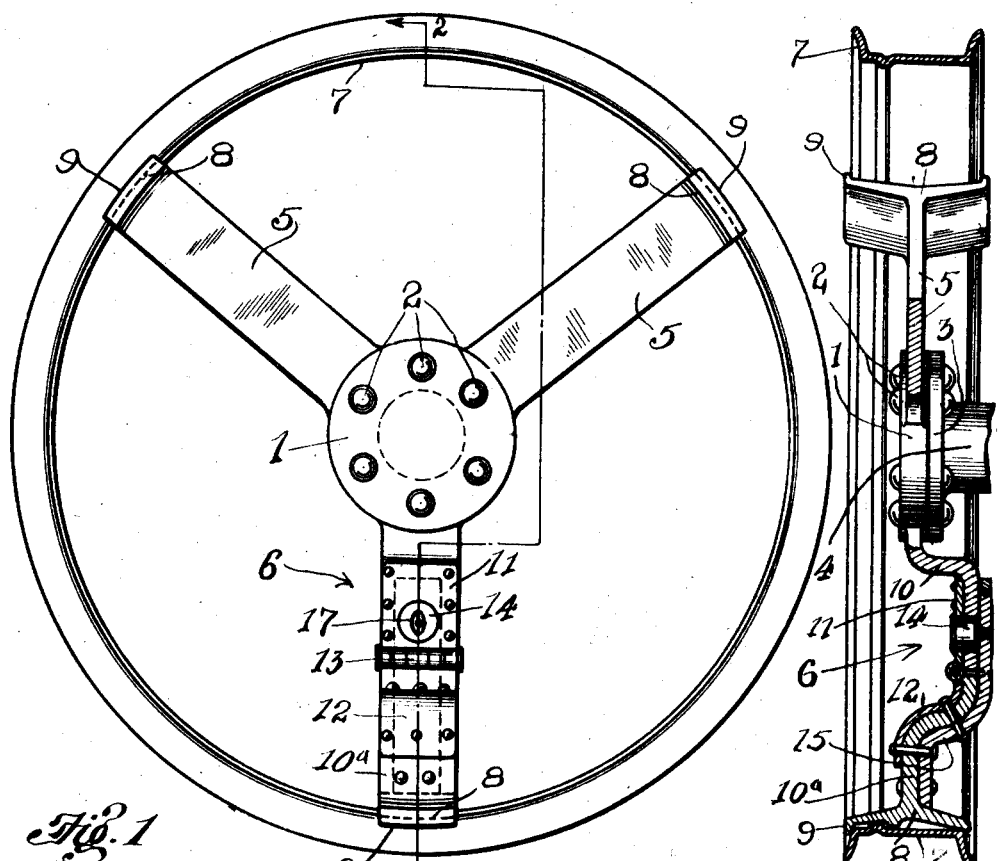
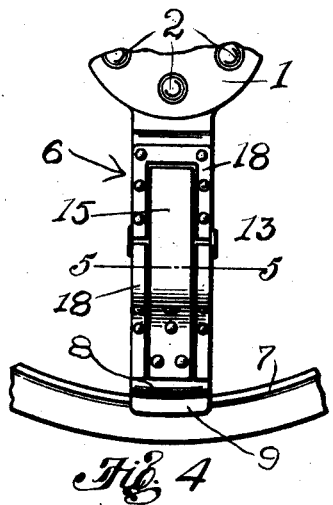
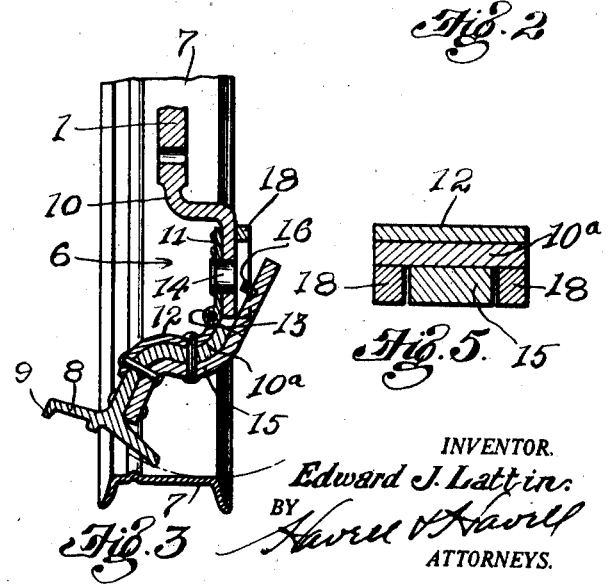
INVENTOR.
Edward J. Lattin.
BY
ATTORNEYS.

Patented May 17, 1927.

1,628,728

UNITED STATES PATENT OFFICE.

EDWARD J. LATTIN, OF CANTON, OHIO.

SPARE-TIRE CARRIER.

Application filed July 9, 1926. Serial No. 121,335.

This invention relates to certain new and useful improvements in spare tire carriers and has for its primary object to provide a tire carrier of the three-point suspension type wherein one of the suspension points comprises a hinged arm for clamping engagement with a tire rim and with the tire rim mounted directly on the three suspension arms to the exclusion of the usual supporting ring.

A further object of the invention is to provide a spare tire carrier wherein the usual retaining bolts and nuts are eliminated and one of the suspension arms for the rim constituting a clamp and embodying a lock structure forming an inherent part thereof.

A still further object of the invention is to provide a spare tire carrier of the above type wherein the retaining means for the tire and rim comprise a hinged suspension arm with a key operated lock structure associated with the hinge joint to hold the arm extended and the spare tire locked on the carrier.

With the above general objects in view and others that will appear as the nature of the invention is better understood, the same consists of the novel construction, combination and arrangement of parts to be hereinafter more fully described and then claimed.

In the accompanying drawing which shows the preferred embodiment of the invention and to which reference is had by like characters designating corresponding parts throughout the several views:—

Fig. 1 is a front elevational view of a spare tire carrier constructed in accordance with the present invention showing the three suspension arms for the tire and rim with one of the arms constituting the locking member.

Fig. 2 is a vertical cross sectional view taken on line 2—2 of Fig. 1 showing the hinged locking arm and the lock structure built into the hinged arm.

Fig. 3 is a fragmentary sectional view, similar to Fig. 2 showing the hinged locking arm in its released position, Fig. 4 is a fragmentary rear elevational view, and Fig. 5 is a detail sectional view taken on line 5—5 of Fig. 4.

Referring more in detail to the accompanying drawing wherein is shown the preferred embodiment of the invention, and particularly to Figs. 1 and 2, there is illustrated a spare tire carrier comprising a central mounting hub 1 that is bolted at 2 to the disk head 3 upon the bracket stud 4 carried by a convenient part of the automobile. As shown, there are preferably three tire suspension arms noted by the reference numeral 5 and of rigid construction and alined with the hub, while the third arm 6 is of hinged construction and laterally offset intermediate its ends as shown in Figs. 2 and 3.

The arms 5 and 6 support and retain the spare tire and rim 7 at their outer ends upon the cross heads 8 which are of the form best illustrated in Figs. 2 and 3, the cross heads having end lugs 9 gripping the sides of the rim 7 to retain the rim in position upon the carrier. The arm 6 forms the locking device for the carrier, and the locked and released positions thereof are shown in Figs. 2 and 3.

The arm 6 depends from the hub 1 and is formed of two sections 10 and 10$^a$ of the shape shown in Fig. 3, the outer sides of the sections 10 and 10$^a$ having straps 11 and 12 anchored thereto with the meeting ends of the strap hinged together at 13 and movable in the direction indicated by the dotted lines. A lock casing 14 is built into the arm section 10 and devices cooperating therewith are carried by the rear side of the arm section 10$^a$.

An arm 15 secured to the arm section 10$^a$ carries adjacent its upper end a latch pin 16 that extends into the lock casing and is retained therein by the locking mechanism and to be released therefrom by action of a key entering the key slot 17 at the outer side of the hinged arm section 10. The arm 15 being carried by the lower arm section 10$^a$ has its upper end overlying the upper section 10, while guide bars 18 carried by the inner sides of the arm sections 10 and 10$^a$ insure correct positioning of the arm 15 in its movement toward the lock 14.

From the above detailed description of the device, it is believed that the construction and operation thereof will at once be understood, it being observed that the arm 6 formed of hinged sections retains the spare tire in position on the carrier against unauthorized removal when in the position shown in Fig. 2 and readily permits removal of the tire and rim when shifted to the position shown in Fig. 3. One of the important features of this invention resides in the built in lock device comprising the lock casing 14, arm 15 and pin 16 which eliminates the usual practice of employing chains, links and shackle bolts.

While there is herein shown and described the preferred form of the invention, it is to be understood that minor changes in details of construction are contemplated, such as will fall within the scope of the invention as claimed.

I claim:—

1. In a spare tire carrier, a central hub, a plurality of radial arms connected to the hub and adapted to support a tire and rim, one of said arms having its intermediate portion offset rearwardly and this arm being formed of sections hinged together at the offset portion of the arm, an extension on one of said sections overlying the other section, a lock casing carried by one arm section, and a latch pin to be received therein, carried by the other section.

2. In a spare tire carrier, a central hub, a plurality of radial arms carried by the hub and adapted to support and retain a tire and rim, one of said arms having its intermediate portion offset rearwardly and of substantially U-shape, said arm being formed of sections hinged together at its offset portion, an extension fixed on one section and overlapping the other section, guiding means on the last mentioned section for guiding said extension, a lock built into the last mentioned section, and a latch pin carried by the extension and cooperating with said lock to hold said sections rigidly relatively to one another.

In testimony whereof I affix my signature.

EDWARD J. LATTIN.